7729X
E. KELLY.
Plow.
Patented Aug 26. 1833
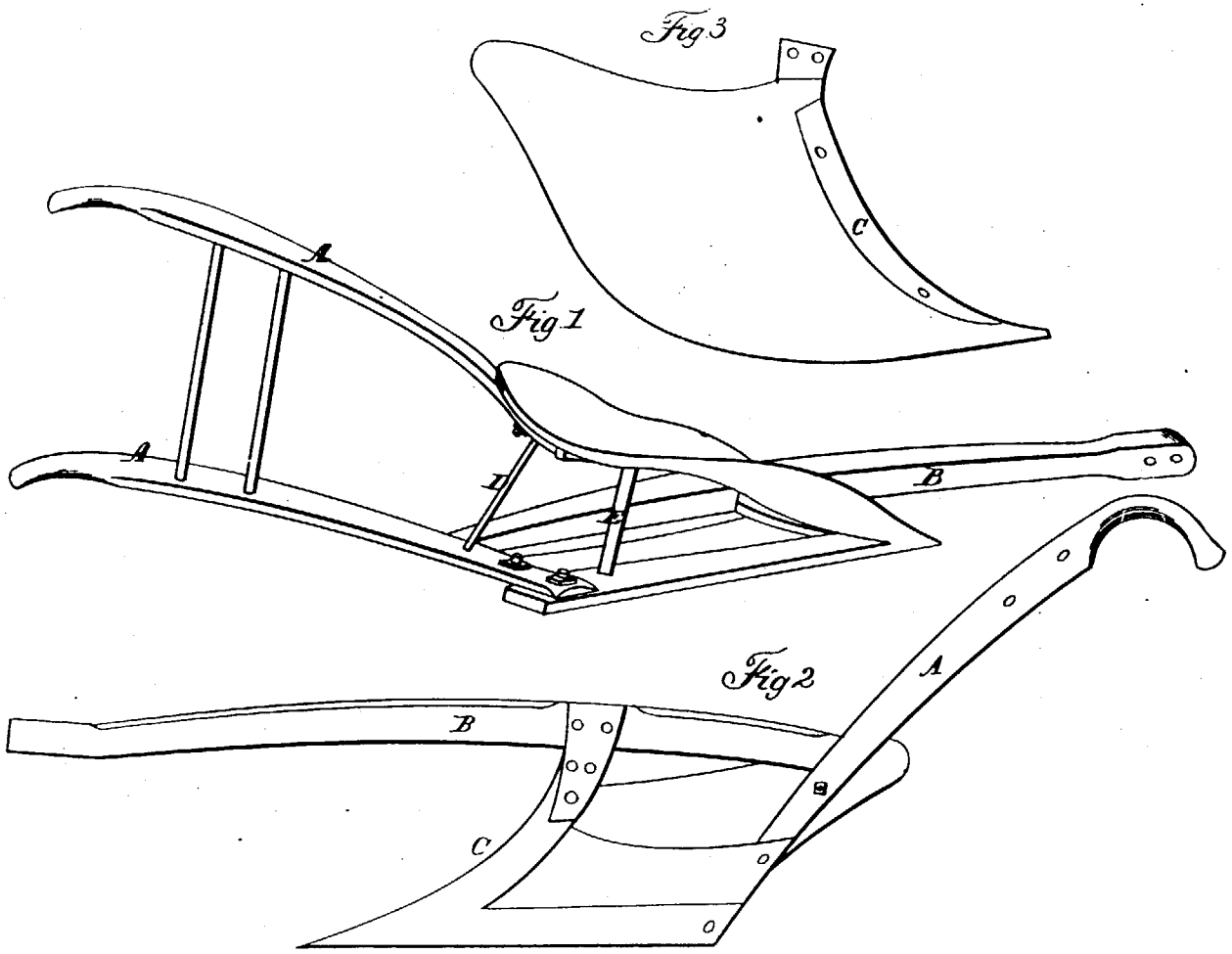
H. PETERS, PHOTO-LITHOGRAPHER, WASHINGTON, D. C.

7729X

UNITED STATES PATENT OFFICE.

ELISHA KELLY, OF BAINBRIDGE, OHIO.

IMPROVEMENT IN PLOWS.

Specification forming part of Letters Patent dated August 26, 1833.

*To all whom it may concern:*

Be it known that I, ELISHA KELLY, of Bainbridge, in the county of Ross and State of Ohio, have invented a new and useful Improvement in Plows; and I do hereby declare that the following is a full and exact description of the construction and operation of said machine as invented or improved by me, to wit:

A beam of wood five feet six inches long, two handles of wood about two feet eight inches long, one of them attached to the beam by a mortise and tenon, the lower part attached to the landside by a screw-bolt, the other attached to the mold-board by a staple at the bottom and screw-bolts at top; the landside from heel to point about twenty-two inches; the mold board and wing or solid piece of iron from heel to point two feet six inches; the landside three inches wide; the wing and landside attached at point by welding; a brace between mold-board and landside. A cutter is attached to the out edge of the wing by two screw-bolts. A hasp attaches the beam to the ring of iron. It is fastened to beam by two screw-bolts and to the landside by three screw-bolts. An iron rod goes from handle to the mold-board; a piece of sheet-iron from the top of the landside under the wing, and attached to the handle by means of a screw.

What I claim as my improvement is—

The above-described rod of iron attaching the handle to mold board, also the hasp named, the sheet-iron, as described, and attaching the cutter to the wing.

ELISHA KELLY.

Witnesses:

JNO. JONES,

J. G. WHITE.